United States Patent
Greenwood

(10) Patent No.: US 9,102,223 B2
(45) Date of Patent: Aug. 11, 2015

(54) ENERGY RECOVERY SYSTEM FOR A VEHICLE DRIVELINE

(75) Inventor: Christopher John Greenwood, Preston (GB)

(73) Assignee: Torotrak (Development) Limited, Leyland, Lancashire (GB)

(*) Notice: Subject to any disclaimer, the term of this patent is extended or adjusted under 35 U.S.C. 154(b) by 717 days.

(21) Appl. No.: 12/992,562

(22) PCT Filed: May 19, 2009

(86) PCT No.: PCT/GB2009/050536
§ 371 (c)(1),
(2), (4) Date: Jul. 8, 2011

(87) PCT Pub. No.: WO2009/141646
PCT Pub. Date: Nov. 26, 2009

(65) Prior Publication Data
US 2011/0256972 A1    Oct. 20, 2011

(30) Foreign Application Priority Data
May 20, 2008  (GB) .................. 0809146.4

(51) Int. Cl.
*F16H 33/08*   (2006.01)
*B60K 6/10*    (2006.01)
*F16H 37/08*   (2006.01)

(52) U.S. Cl.
CPC ............ *B60K 6/105* (2013.01); *F16H 37/0853* (2013.01); *Y02T 10/6204* (2013.01); *Y10T 74/19051* (2015.01)

(58) Field of Classification Search
CPC .................................. B60K 6/30; B60K 6/105
See application file for complete search history.

(56) References Cited

U.S. PATENT DOCUMENTS 3,641,843 A    2/1972  Lemmens
3,665,788 A    5/1972  Nyman
(Continued)

FOREIGN PATENT DOCUMENTS

EP    0 043 909 A1    1/1982
EP    0 127 986 A2    12/1984
(Continued)

OTHER PUBLICATIONS

PCT Notification of Transmittal of the International Search Report and the Written Opinion of the International Searching Authority, or the Declaration for PCT Counterpart Application No. PCT/GB2009/050536, 15 pgs., (Aug. 4, 2009).
(Continued)

*Primary Examiner* — Robert Hodge
*Assistant Examiner* — Ryan Dodd
(74) *Attorney, Agent, or Firm* — Blakely, Sokoloff, Taylor & Zafman LLP

(57) ABSTRACT

The invention concerns a kinetic energy recovery system for use in a vehicle driveline. The system has a flywheel (24) serving to store energy. A continuously variable transmission (32) serves to transfer drive between the flywheel and a driveline of the vehicle at a steplessly variable CVT speed ratio. The continuously variable transmission has a variator (34) which has a rotary variator input (40) and a rotary variator output (42). The variator serves to transfer drive between its input and output at a continuously variable variator speed ratio. The continuously variable transmission further comprises a shunt gear arrangement (36) having a first rotary shunt input which is drivably coupled to the rotary variator input, a second rotary shunt input which is drivably coupled to the rotary variator output, and a shunt rotary output which is drivably coupled to the flywheel.

6 Claims, 3 Drawing Sheets

(56) References Cited

U.S. PATENT DOCUMENTS

| | | | |
|---|---|---|---|
| 4,471,668 A | 9/1984 | Elsner | |
| 6,506,139 B2* | 1/2003 | Hirt et al. | 477/3 |
| 7,246,672 B2* | 7/2007 | Shirai et al. | 180/65.25 |
| 2002/0055407 A1* | 5/2002 | Druten et al. | 475/207 |
| 2010/0184549 A1* | 7/2010 | Sartre et al. | 475/5 |

FOREIGN PATENT DOCUMENTS

| | | |
|---|---|---|
| EP | 0 444 086 B1 | 1/1993 |
| EP | 0 952 023 A1 | 10/1999 |
| FR | 2 104 548 A | 4/1972 |
| GB | 2 098 016 A | 11/1981 |
| GB | 2 095 188 A | 9/1982 |
| JP | 57-501072 A | 6/1982 |
| JP | 4078658 B1 | 4/2008 |
| WO | WO 2004/000595 A1 | 12/2003 |
| WO | WO 2009010819 A1 * | 1/2009 |

OTHER PUBLICATIONS

PCT Notification concerning Transmittal of International Preliminary Report on Patentability (Chapter I of the Patent Cooperation Treaty) for PCT Counterpart Application No. PCT/GB2009/050536, 8 pgs., (Dec. 2, 2010).

Patents Act 1977: Search Report under Section 17 for UK Application No. GB0809146.4, 1 pg., (Sep. 17, 2008).

First Office Action for Chinese Counterpart Application No. 200980118121.3, 4 pgs., (Oct. 8, 2012).

Second Office Action for Chinese Counterpart Application No. 200980118121.3, 4 pgs., (May 30, 2013).

First Office Action for Japanese Counterpart Application No. 2011-510050, 2 pgs., (Jul. 31, 2013).

* cited by examiner

ENERGY RECOVERY SYSTEM FOR A VEHICLE DRIVELINE

CROSS-REFERENCE TO RELATED APPLICATIONS

This patent application is a U.S. National Phase application under 35 U.S.C. §371 of International Application No. PCT/GB2009/050536, filed May 19, 2009, entitled AN ENERGY RECOVERY SYSTEM FOR A VEHICLE DRIVELINE, which claims priority to Great Britain patent application number 0809146.4, filed May 20, 2008.

FIELD

The present invention is concerned with kinetic energy recovery systems for vehicles.

BACKGROUND

Hybrid powertrains, which recover and reuse kinetic energy traditionally wasted via braking with the target of reducing fuel consumption and emissions, are widely viewed as an essential solution for the road transport sector. They are also potentially applicable to other vehicles, particularly trains. The majority of hybrid systems both in series production and under development are based upon electrical architectures with a variety of designs and storage media. However, converting mechanical energy to electrical energy and then to chemical energy and vice versa produces rather poor system efficiencies. In addition the storage media, power electronics and motor/generators produce a complex powertrain with corresponding impacts on system cost, weight and package, An alternative to the electric hybrid powertrain is a mechanical hybrid system. A mechanical hybrid powertrain utilises a rotating flywheel as the energy storage device and a variator to transfer the energy to and from the vehicle driveline.

Flywheel mechanical hybrid systems offer advantages of higher efficiencies due to the removal of the energy conversions together with a significantly less complex system providing considerable weight, package and cost benefits over electrical systems. Flywheel mechanical hybrids are not new and have been previously developed by a number of companies. Interest in them has been renewed following the introduction of regulations in Formula 1 motor racing which will require racing cars to be capable o I kinetic energy recovery and re-use.

A problem can arise in using a conventional variator in a KERS system, in that the range of ratios provided by a typical variator can be smaller than the expected spread of speed ratios between the engine and the flywheel.

SUMMARY

In accordance with a first aspect of the present invention, there is a kinetic energy recovery system for a vehicle driveline, the system comprising a flywheel and a continuously variable transmission for transferring drive between the flywheel and the vehicle driveline at a continuously variable CVT speed ratio, the continuously variable transmission comprising a variator having a rotary variator input and a rotary variator output, the variator serving to transfer drive between the rotary variator input and the rotary variator output at a continuously variable variator speed ratio, and a shunt gear arrangement having a first rotary shunt input which is drivably coupled to the rotary variator input, a second rotary shunt input which is drivably coupled to the rotary variator output, and a shunt rotary output which is drivably coupled to the flywheel.

The shunt gear is preferably of epicyclic type, although other gear arrangements having three shafts and two degrees of freedom in terms of shaft speeds could be substituted. It is convenient to refer to two of the shunt's shafts/rotary parts as "inputs" and the other as an "output" but the designation is a somewhat arbitrary one because the flow of power can be in either direction—from the fly wheel to the driveline or vice versa. The shunt gear makes possible an expansion of the ratio spread of the CVT beyond that provided by the variator alone.

In a particularly preferred embodiment of the present invention, a vehicle driveline provided with the kinetic energy recovery system comprises a motor vehicle transmission serving to transmit drive between engine and vehicle wheels, and the kinetic energy recovery system is coupled to a point in the driveline between the engine and the motor vehicle transmission. Preferably, a clutch is provided for selectively de-coupling the engine from the driveline whilst leaving the kinetic energy recovery system connected to it. To this end the clutch is preferably positioned in the driveline between its coupling to the kinetic energy recovery system and the engine. A driveline of this type makes it possible to disconnect the engine from the transmission and the vehicle wheels when drive from the engine is not required, whilst still leaving the kinetic energy recovery system connected through the transmission to the vehicle wheels to drive the vehicle. Modelling carried out by the applicant has shown this to be potentially a very energy efficient system.

Preferably the driveline incorporates a further clutch in the driveline between its coupling to the kinetic energy recovery system and the vehicle transmission. The further clutch serves to de-couple the transmission from both kinetic energy recovery system and engine e.g. when the vehicle comes to a halt.

In accordance with a second aspect of the present invention there is a vehicle drive arrangement comprising a driveline having an engine and a motor vehicle transmission for transferring drive between the engine and the driven wheels of a motor vehicle, the arrangement further comprising a kinetic energy recovery system coupled to the driveline between the motor vehicle transmission and the engine, and a clutch in the driveline between the engine and the kinetic energy recovery system, so that by disengaging the clutch the engine is disconnected from the kinetic energy recovery system and from the motor vehicle transmission.

In such an arrangement the kinetic energy recovery system preferably comprises a continuously variable transmission connected on one side to the driveline and on its other side to a flywheel.

The arrangement makes it possible to drive the motor vehicle through the transmission from the kinetic energy recovery system alone, with the engine disconnected. Hence the engine need only be run intermittently and overall efficiency can be improved.

BRIEF DESCRIPTION OF THE DRAWINGS

A specific embodiment of the present invention will now be described with reference to the accompanying drawings, in which.

DETAILED DESCRIPTION

Figure 1:
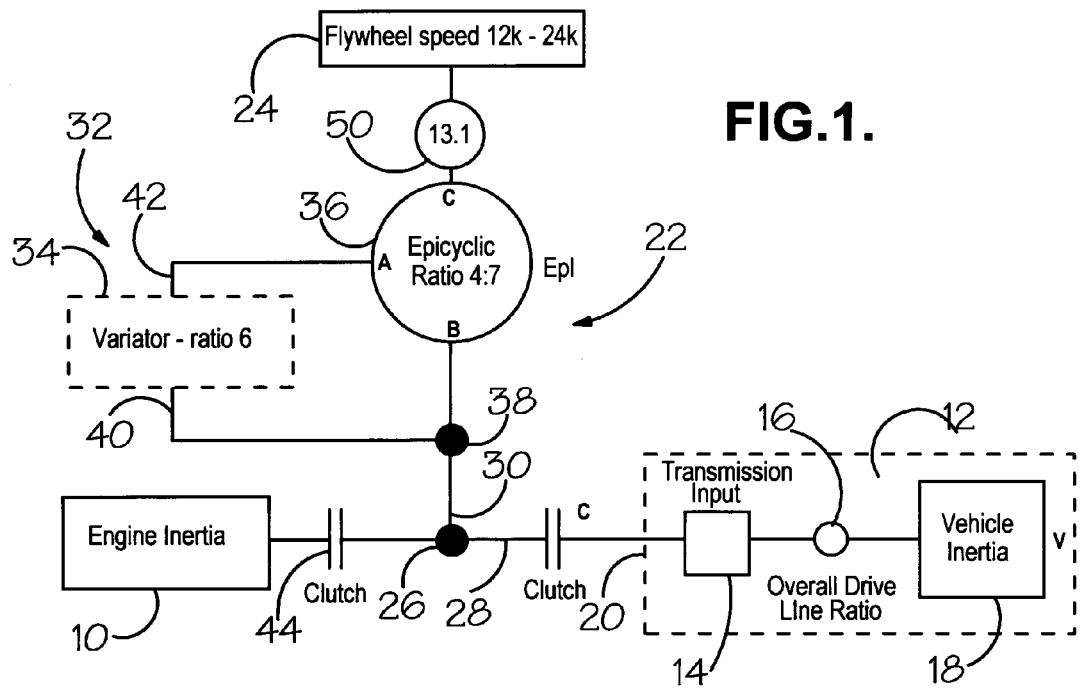
FIG. 1 is a schematic representation of a driveline embodying the present invention.

Engine 10 seen in FIG. 1 is in current embodiments an internal combustion engine although in principle the invention could be implemented using a rotary driver of another type. The illustrated driveline is intended for use in a motor vehicle but could be applied to vehicles of other types e.g. trains. A dotted box 12 in FIG. 1 contains items which are typical of any motor vehicle driveline. The vehicle's transmission, serving to transfer rotary drive from the engine 10 to the vehicle's driven wheels (not shown), is represented in the drawing by a box 14 which is the transmission input and a circle 16 which represents the drive line's speed ratio. The transmission may be of any suitable type, and may provide stepped or continuously variable ratio. The drive transmitted to the vehicle wheels acts upon vehicle inertia 18 to accelerate/decelerate it, A first clutch 20 in this example serves to selectively decouple the transmission input 14 from the engine 10, and also from a kinetic energy recovery system ("KERS") 22.

The KERS 22 has a flywheel 24 able to receive energy from the driveline, to store the energy and when appropriate to return it to the driveline. It couples to the driveline through gearing 26 providing a fixed speed ratio between a driveline shaft 28 and a KERS input shaft 30. Drive is transferred between the flywheel 24 and the driveline shaft 28 by a continuously variable transmission ("CVT") 32 comprising a variator 34, a shunt gear arrangement 36, and a spur gear arrangement 38.

The variator 34 has a rotary variator input 40 and a rotary variator output 42, and serves to transfer drive from one to the other at a speed ratio (input speed divided by output speed) which is continuously (i.e. steplessly) variable. Variators of numerous types are well known in the automotive field. The present embodiment uses a variator of toroidal-race, rolling-traction type, more specifically one which is full toroidal and torque controlled. Details of such a variator are known in the art and are to be found in numerous published patent cases to Torotrak (Development) Ltd., particularly EP0444086.

Variator rotary input 40 runs at a speed which is a fixed multiple of the speed of driveline shaft 28 and hence (while a second clutch 44 is engaged) of the engine speed. Variator rotary output 42 is coupled to the flywheel 24. In the present example the flywheel is to be maintained at a speed between 12,000 and 24,000 rpm. The engine idles at 1000 rpm and has a maximum speed of 6,000 rpm. The CVT 32 thus needs to be able to provide a ratio spread of 12. This is potentially problematic since variators typically provide a narrower ratio speed, e.g. of 6 in the present embodiment.

This problem is overcome in accordance with the present invention by means of the shunt gear arrangement 36 which, in the present embodiment, is of epicyclic type. It has a first rotary shunt input which is coupled to the KERS input shaft 30 and hence, via spur gear arrangement 38, to the rotary variator input 40. In the present embodiment the first rotary shunt input is sun gear S of the shunt gear arrangement 36. A second rotary shunt input is coupled to the rotary variator output shaft 42. In the present embodiment the second rotary shunt input is annular gear A of the shunt gear arrangement. A rotary shunt output is formed in the present embodiment by planet carrier C of the shunt and is coupled to the flywheel 24 via gearing 50 providing a speed increase at the flywheel, Given suitable choice of gear ratios, such an arrangement provides a ratio spread for the CVT 32 as a whole which is greater than that of the variator, albeit at some cost in terms of efficiency since power is recirculated through the (relatively lossy) variator 34. The second clutch 44 enables the engine to be de-coupled-and-stopped when power from it is not required, be it because the power flow to the vehicle 18 is not required (the vehicle is coasting or decelerating) or because the required power is being drawn from the KERS 22.

In automotive applications the driveline must supply power to ancillary systems such as the alternator, air-conditioning etc. Some of these (e.g. air-con) must be powered continuously. If the engine is to be run intermittently then such systems are to be driven not directly from the engine but from the flywheel 24, and more specifically from the transmission input. Other ancillaries, such as the alternator, can operate with intermittent power input and can be more efficiently driven from the engine.

Figure 2:
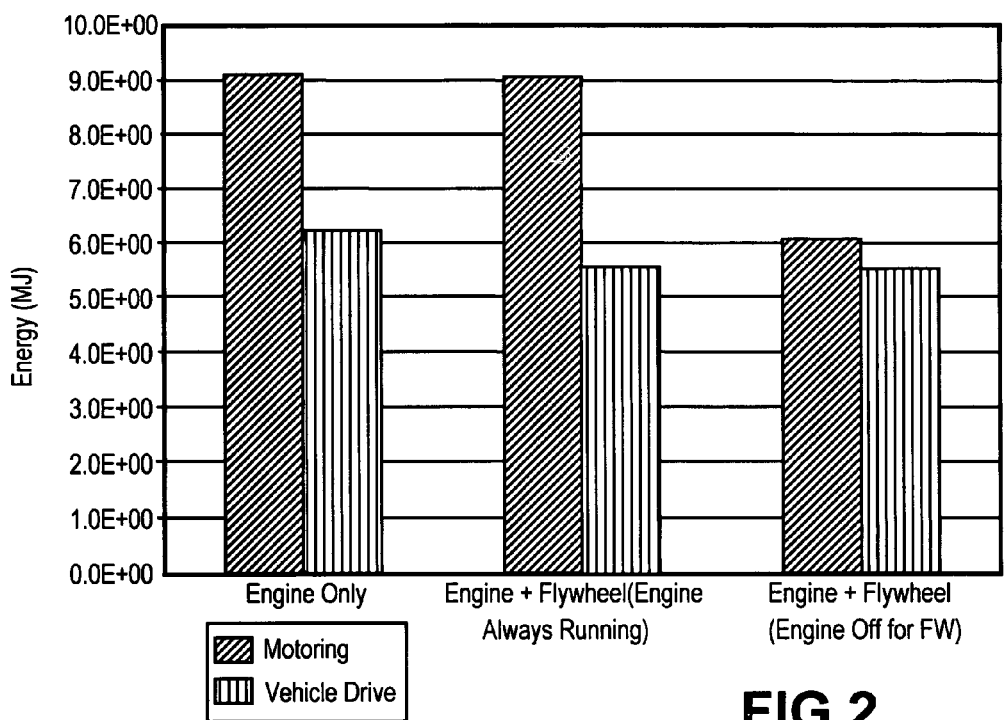
FIG. 2 is bar chart showing for comparison (a) the energy dissipated by a vehicle engine overcoming its internal losses and (b) the energy dissipated in driving the vehicle, on a standard vehicle operating cycle (NEDC)

Performance of the illustrated type of driveline has been mathematically modelled using industry recognised cycles representing typical motor car usage. One such is the "New European Driving Cycle" ("NEDC") which has relatively low vehicle speeds over the cycle with gentle accelerations and decelerations and considerable time spent with the vehicle stationary and the engine at idle speed. Even though the engine delivers little power during these phases, it absorbs considerable energy overcoming its inherent motoring losses. FIG. 2 compares the energy dissipated by the engine overcoming its internal losses (Motoring) with the energy dissipated by the vehicle completing the NEDC cycle (Vehicle Drive). The first data pair (Engine Only) shows the energy balance for a conventional non-hybrid driveline. The low performance required of the vehicle means that 60% (9 MJ) of the total energy expended (15 MJ) is dissipated by the engine's internal losses. The second data pair shows the energy saved by the addition of regenerative braking (0.64 MJ) derived from the flywheel. The engine is run over the complete cycle and so its internal losses are unchanged. The last data pair shows the effect of switching the engine off when not required i.e. when the flywheel is charging or discharging. Although it does not contribute directly to the energy saved (3.5 MJ) the flywheel enables the marked reduction in the energy dissipated by the engine's internal losses, hence a net saving of 20%. To put this into context, 9 MJ dissipated over the cycle (1180s) is equivalent to an average power loss of 7.6 Kw or the assumed engine loss at 1200 rpm. By enabling "engine off" operation for parts of the cycle, the system considered here thus makes possible substantial fuel savings.

Figure 3:
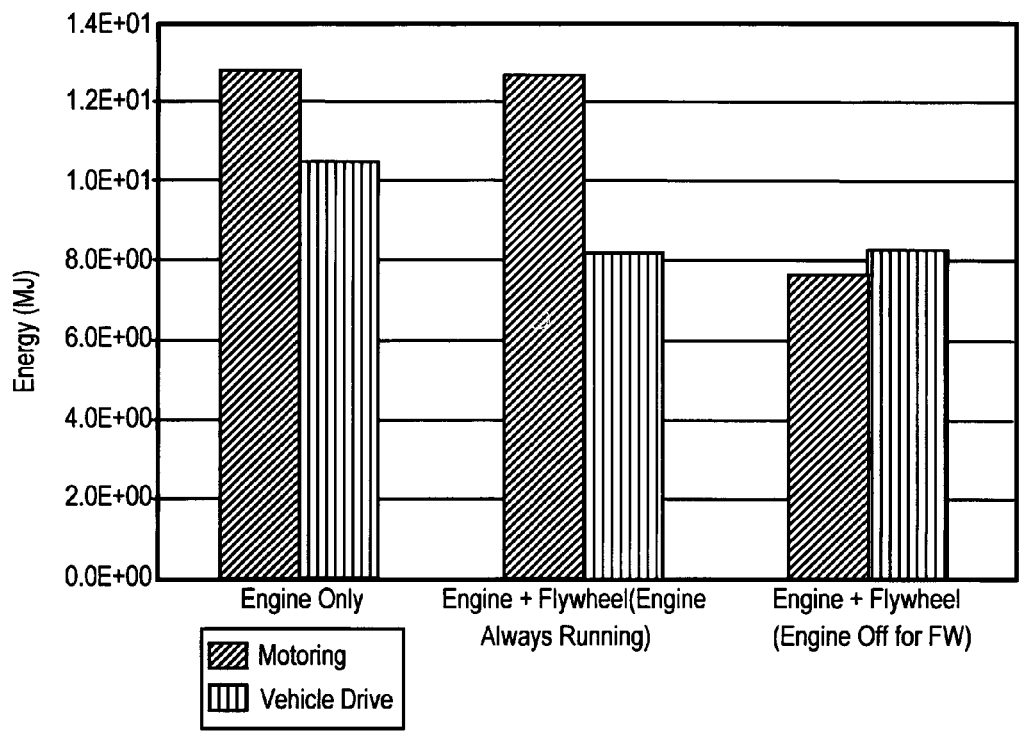
FIG. 3 is a bar chart similar to FIG. 2 but representing performance on a different vehicle operating cycle (FTP75)

The same analysis applied to the Metro element of the FTP75 (Federal Test Procedure) cycle illustrates the effect of a more aggressive speed profile—FIG. 3. The greater energy dissipated by the vehicle provides more opportunity for energy savings from regenerative braking (7%). But again the majority of the available savings (30%) is derived from limiting engine use.

Figure 4:
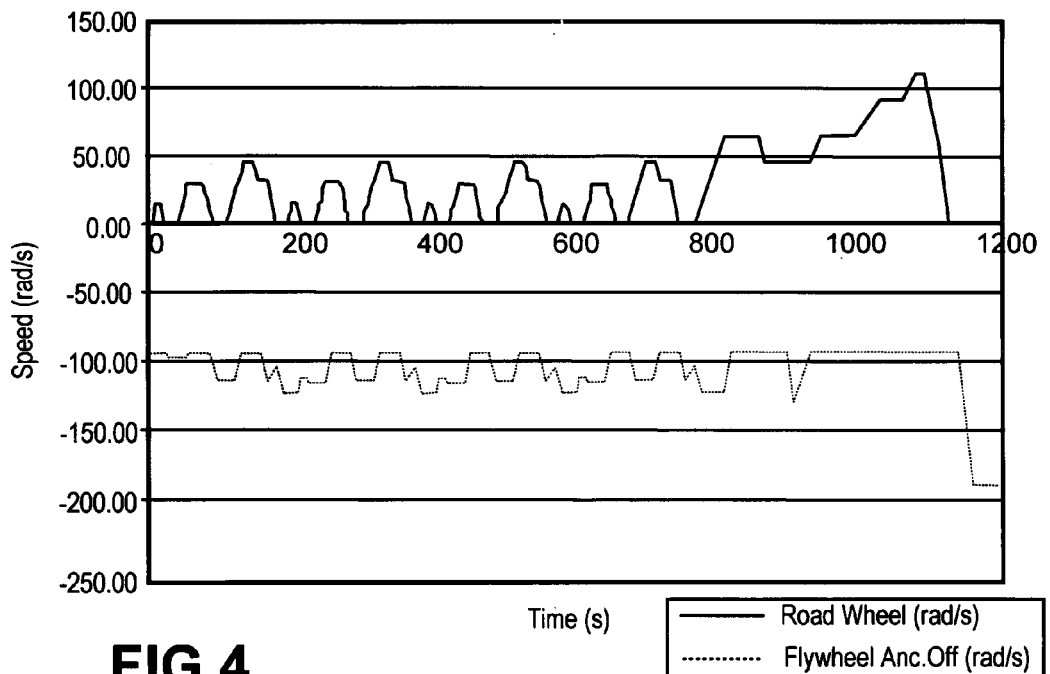
FIG. 4 is a graph of road wheel and flywheel speed over time, for the NEDC cycle.

FIG. 4 plots the vehicle and resulting flywheel speed profiles for the NEDC cycle. It shows the relatively low energy levels stored by the flywheel contrasted against the high proportion of time available for engine-off operation.

Figure 5:
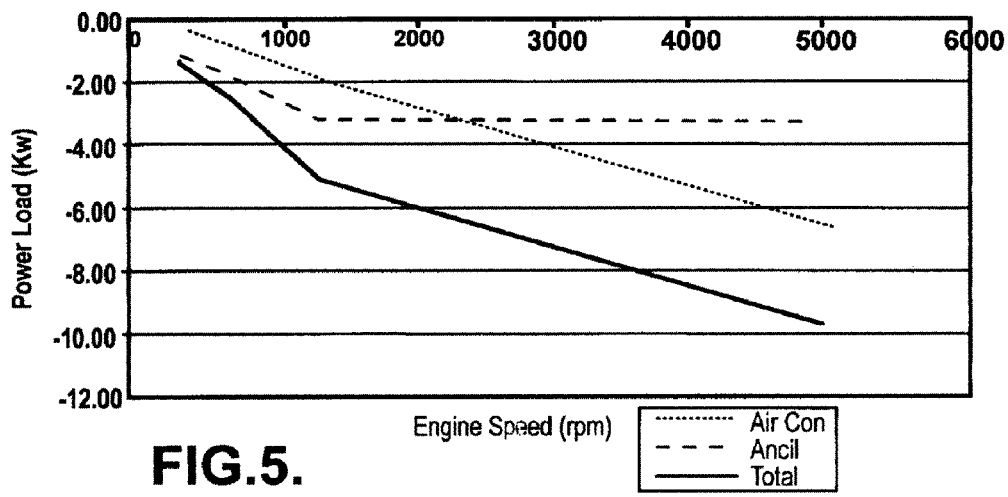
FIG. 5 is a graph of the power supplied to vehicle air conditioning and to other "ancillary" vehicle systems against engine speed.
Figure 6:
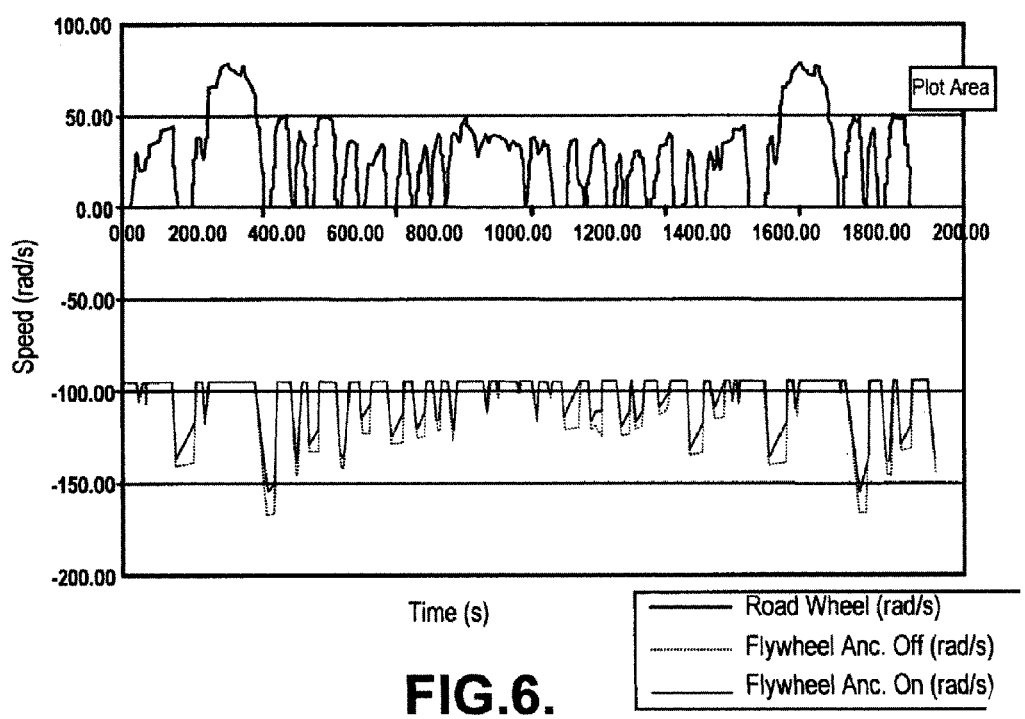
FIG. 6 is a graph similar to FIG. 4 but representing the FTP75 cycle.

Heavy reliance upon the reduced usage of the engine requires the flywheel to power at least a proportion of the vehicle's ancillary load. FIG. 5 shows the assumed power split between air-conditioning and the rest. The air-conditioning typifies the continuous element, the rest is assumed to be run with the engine. FIG. 6 shows the Metro clement of the FTP75 cycle plotted with the resulting flywheel speeds for ancillaries on and off. Adding the ancillary load caused the energy benefits to reduce from 30% to 18%.

What is claimed is:

1. A vehicle driveline and energy recovery system comprising:
   a vehicle transmission configured to transmit drive between an engine and vehicle wheels; and
   a kinetic energy recovery system having an input which is coupled to the driveline, the input being coupled to the driveline at a point between the engine and the vehicle transmission, the kinetic energy recovery system comprising:
      a flywheel to receive energy from the driveline, to store the energy, and to return the stored energy to the driveline and
      a continuously variable transmission for transferring drive between the flywheel and the vehicle driveline at a continuously variable speed ratio, the continuously variable transmission comprising:
         a variator having a rotary variator input and a rotary variator output, the variator serving to transfer drive between the rotary variator input and the rotary variator output at a continuously variable variator speed ratio, and
         a shunt gear arrangement having a first rotary shunt input which is drivably coupled to the rotary variator input, a second rotary shunt input which is drivably coupled to the rotary variator output, and a shunt rotary output which is drivably coupled to the flywheel.

2. The vehicle driveline as claimed in claim 1 in which the shunt gear arrangement comprises an epicyclic gear arrangement.

3. The vehicle driveline as claimed in claim 1 in which the variator is torque controlled.

4. The vehicle driveline as claimed in claim 3, further comprising a clutch for selectively de-coupling the engine from the driveline whilst leaving the kinetic energy recovery system connected to it.

5. The vehicle driveline as claimed in claim 4 in which the clutch is positioned in the driveline between its coupling to the kinetic energy recovery system and the engine.

6. The vehicle driveline as claimed in claim 5 comprising a further clutch in the driveline between its coupling to the kinetic energy recovery system and the motor vehicle transmission.

* * * * *